United States Patent
Bose et al.

(10) Patent No.: US 8,108,714 B2
(45) Date of Patent: Jan. 31, 2012

(54) METHOD AND SYSTEM FOR SOFT ERROR RECOVERY DURING PROCESSOR EXECUTION

(75) Inventors: Pradip Bose, Yorktown Heights, NY (US); Jude A. Rivers, Cortlandt Manor, NY (US); Victor Zyuban, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 11/684,775

(22) Filed: Mar. 12, 2007

(65) Prior Publication Data

US 2008/0229145 A1 Sep. 18, 2008

(51) Int. Cl.
*G06F 11/00* (2006.01)

(52) U.S. Cl. .......................................................... 714/10

(58) Field of Classification Search ...................... 714/10
See application file for complete search history.

(56) References Cited

U.S. PATENT DOCUMENTS

| 6,124,820 | A | * | 9/2000 | Norman | 341/161 |
| 7,370,230 | B1 | * | 5/2008 | Flake | 714/10 |
| 2002/0056034 | A1 | * | 5/2002 | Gearty et al. | 712/23 |

* cited by examiner

*Primary Examiner* — Amine Riad
(74) *Attorney, Agent, or Firm* — Ido Tuchman; William J. Stock

(57) ABSTRACT

A system for soft error recovery used during processor execution. The system may include a microprocessor, processor, controller, or the like. The system may also include a pipeline to reduce the cycle time of the processor, and a write-back stage within the pipeline. The system may further include an error-correcting code stage before the write-back stage that checks a value to be written by the processor for any error. The error-correcting code stage may correct any error in the value, and the pipeline may lack a recovery unit pipeline.

20 Claims, 4 Drawing Sheets

METHOD AND SYSTEM FOR SOFT ERROR RECOVERY DURING PROCESSOR EXECUTION

STATEMENT OF GOVERNMENT SUPPORT

This invention was made with Government support under Contract No.: NBCH3039004 awarded by Defense Advanced Research Projects Agency (DARPA). The Government has certain rights in this invention.

FIELD OF THE INVENTION

The invention relates generally to data processing, and in particular to a microprocessor implemented method and system for storing prior processor executed states and being able to use such in recovering from soft errors when they do occur.

BACKGROUND OF THE INVENTION

Use of data processing systems has grown exponentially in recent years because of the increased use of computing devices. Users have come to rely on data processing systems in every aspect of business and society. With this reliance therefore, preventing potential undetectable errors in a microprocessor during program execution has become increasingly important to a system's overall performance.

As technology feature sizes continue to shrink due to semiconductor advancements, microprocessor design has a chance at continuing performance improvement. At the same time however, as devices get smaller and smaller, there is an emerging real concern for future generation computing systems' susceptibility to soft and transient errors. Soft and transient errors are generally caused by effects of alpha particles and cosmic rays, as well as to some extent, power and voltage glitches. When alpha particles or neutrons (as in cosmic rays) hit transistors, electron-hole pairs are generated and these might be collected by devices. Soft errors happen when the amount of charge collected by a device exceeds the device's critical charge, often referred to as Qcrit, required to upset the device from its normal operation. Soft errors appear as current pulses in transistors. They might cause errors in combinational logic or cause bit flips in random access memory (RAM) cells.

Historically, soft errors were only of great concern to outer space applications where cosmic rays are strong and random access memory were designed with very small Qcrit. However, technology projections indicate that the average Qcrit per transistor will reduce by a factor of 2 for each new generation of technology as transistors get smaller and smaller. Hence, it is expected that failures in time ("FIT") for the typical microprocessor will increase very quickly as we go into the future of device miniaturization. Even if the average Qcrit per transistor for the storage and logic cell were to remain the same, it is clear that with increasing miniaturization, more and more transistors will fit into the space that had hitherto been occupied by one or two transistors. Hence, the incidence of soft failures per a fixed circuit area is bound to increase.

To ensure and protect computer systems against soft errors in general, many fault tolerance approaches have been used traditionally to detect and possibly correct errors. These approaches basically comprise information redundancy and execution redundancy. Data storage structures (e.g. SRAMS, register arrays, and queues) within a microprocessor chip, due to their regular patterns, tend to be protected by well-known information redundancy techniques like parity protection and error correcting codes (ECC). Combinational logic structures (e.g. ALUs, FXUs, and FPUs), within a processor chip, on the other hand, have irregular patterns which make it necessary to protect them through execution redundancy.

Execution redundancy can be further distinguished between time and space. Space redundancy is achieved through executing a task or instruction on multiple disjoint hardware structures, and comparing the results for accuracy. Space redundancy generally has low performance overhead but necessitates hardware in proportion to the number of disjoint computations.

Time redundancy is achieved through executing a task or instruction on the same hardware multiple times, and comparing the results for accuracy. Time redundancy generally has low hardware requirements overhead but results in high performance overhead, but given the trends of leakage power adverse effects on a microprocessor chip's general health, the time redundancy concept remains a good option for protecting a system against errors. It is not uncommon to see a mix of information redundancy and time redundancy implementations for reliability protections in high-end microprocessor system cores.

Soft error reliability support in server microprocessors have evolved from the era of entire replication of processing units to the current single core approach with pervasive detection supported by a multi-stage auxiliary Recovery unit (or R-unit for short) pipeline for storing the checkpointed states of the processor execution. Whereas the former approach suffered from about 40% in area overhead, the latter shows about 15% area overhead. However, the latter approach, though less in area overhead, is still disadvantaged in area overhead and can be disadvantaged in error coverage which depends greatly on how much detection support that can be provided in the core pervasives. In this emerging leakage- and yield-sensitive design era, both of these approaches appear non-scaleable for reliability, availability and serviceability ("RAS") support, especially when one considers the very basic fact that the average simultaneous number of threads running on a core is fast increasing.

SUMMARY OF THE INVENTION

In view of the foregoing background, it is therefore an object of the invention to provide a fully core integrated R-unit functionality using no auxiliary pipeline, where the checkpointed state of the processor is stored in the architectural register files rather than in a dedicated storage. That is, the register files (plus extra storage buffers) in the ordinary microprocessor pipeline are secured and hardened as the golden state. This approach significantly reduces the IRR recovery area overhead to less than 8% and offers possible further reduction through selective protection of the most vulnerable on-chip regions.

This and other objects, features, and advantages in accordance with the invention are provided by a system for soft error recovery used during processor execution. The system may include a microprocessor, processor, controller, or the like. The system may also include a pipeline to reduce the cycle time of the processor, and a write-back stage within the pipeline.

The system may further include an error-correcting code stage before the write-back stage that checks a value to be written by the processor for any error. The error-correcting code stage may correct any error in the value. The pipeline may lack a recovery unit pipeline.

The system may also comprise a register file within the pipeline to provide checkpointing storage for the pipeline, and a bypass stage which provides bypassing operations around the register file. The system may further comprise a recovery buffer in communication with the pipeline to provide checkpointing storage for the pipeline. The recovery buffer may be error-correcting code protected.

The system may also include an alignment network to provide the value to the recovery buffer. The system may further include an error-correcting code syndrome logic to check and, if necessary, correct the value stored in the recovery buffer.

Another aspect of the invention is a method for soft error recovery during processor execution. The method may include reducing cycle time of a processor with a pipeline. The method may also include checking a value to be written by the processor for any error in an error-correcting code stage within the pipeline before a write-back stage of the pipeline.

DETAILED DESCRIPTION OF THE PREFERRED EMBODIMENTS

Figure 1:
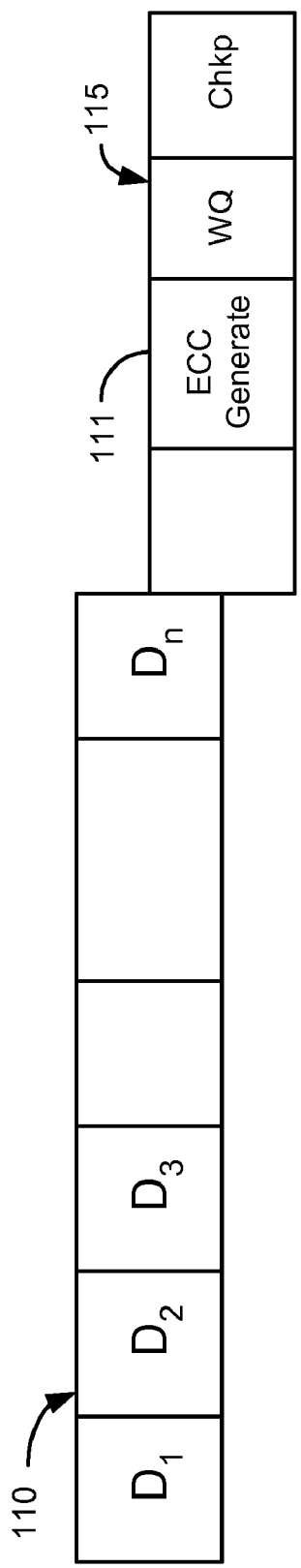
FIG. 1 is a block diagram illustrating a typical prior art pipeline of a microprocessor where the IRR concept is implemented for system reliability.

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As will be appreciated by one skilled in the art, the present invention may be embodied as a method, system, or computer program product. Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language, low-level languages, such as assembly language, or similar programming languages.

The present invention may be implemented in a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment of the present invention, the techniques described herein are utilized in computer systems requiring system-level reliability, availability and serviceability ("RAS").

High end IBM server systems are known in the computer industry to employ the most comprehensive and robust system-level RAS features of any servers in the world. Of particular importance in these systems is the attention paid to protecting against soft, transient and hard error failures at the microprocessor chip level.

Within the processor chip, a robust RAS strategy, referred to mainly as Instruction Retry Recovery ("IRR"), can be (and has been) implemented in one of two major ways. By replicating the entire processing unit, where dual-cores are used for cycle-by-cycle execution and result comparison and recovery through an on-chip function unit for error recovery, referred to as a Recovery unit or R-unit. Or, within a single microprocessor core, adding error detection pervasively in the dataflow and control units and adding a multi-stage auxiliary R-unit pipeline for storing the checkpointed states of the processor execution.

IRR can be described simply as a RAS concept that combines both information redundancy and time redundancy in protecting the system. The fundamental workings of IRR is to maintain an architectural checkpoint on hardware instruction boundaries, which can be restored in the event of an error so that processing can be resumed (retried) from the last instruction checkpoint. Instruction checkpointing has dependencies on the logic throughout the processor.

The IRR concept may be generally characterized as:
A means of preserving the entire architected state of the processor in a hardened checkpoint.
Protecting the integrity of the checkpoint with robust error detection throughout the processor.
A means of resetting non-checkpointed logic to attempt to remove the error.
A means of restoring the checkpoint.

As stated, the register checkpoint in IBM server cores is implemented using a Recovery unit (R-unit). All architected registers for every thread are captured in the R-unit with the checkpoint maintained on instruction group boundaries. These register structures in the R-unit are additional to the ordinary register structures found in the processor pipeline.

Error detection throughout the processor core is essential to protecting the checkpoint. Errors must be reported from all areas of the processor, and logically OR'ed together to block checkpoint updates.

Actual error detections across the various data and logic structures in the microprocessor pipelines occurs through parity checking, ECC checking and residual checking. Such errors, when detected, are then forwarded to immediately stop further checkpointing.

Errors which are detected too late to be reported in time to block checkpointing must be escalated to processor checkstop. A processor checkstop typically leads to the migration of the checkpointed state from the affected processor to another/different processor to re-start the execution. Errors which affect the restoration of the checkpoint must also be escalated to processor checkstop, but as long as the checkpoint is intact, restoration on an alternate processor may be possible.

Recovery in the IBM server microprocessor cores is generally performed on a processor core basis, not on an instruction or thread basis. Reported errors do not need to be associated with an instruction boundary, as long as they are early enough to block further checkpointing.

If checkpointing is not blocked early enough when an error is detected, there is the likelihood that the error or derivations of it may corrupt the checkpointed state. It is perfectly acceptable to "back up" to a checkpoint earlier than the instruction which encountered the error. In a microprocessor system running multiple threads, all threads are restored from the most recent checkpoint regardless of the error that was detected.

In order to make IRR more effective for functional errors, it is desirable to modify (simplify) the execution flow through the microprocessor core for some short amount of time immediately after recovery (i.e. single dispatch, single-threaded, non-pipelined). Recovery is considered successful when enough instructions execute successfully that the checkpoint advances beyond the simplified-execution mode window and full-speed execution is resumed without error.

Figure 2:
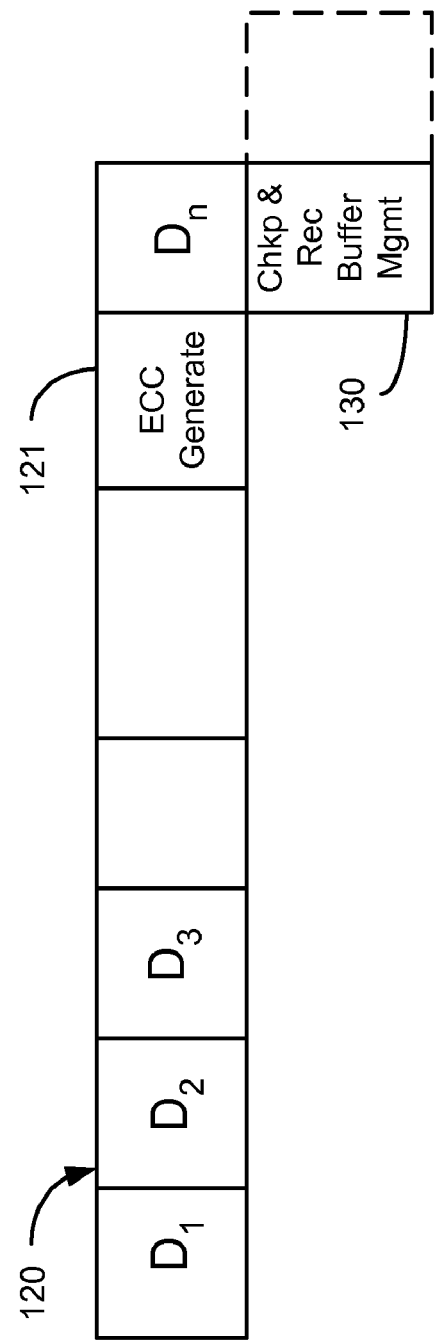
FIG. 2 is a block diagram illustrating a pipeline of a microprocessor showing the IRR concept implementation in accordance with the invention.
Figure 3:
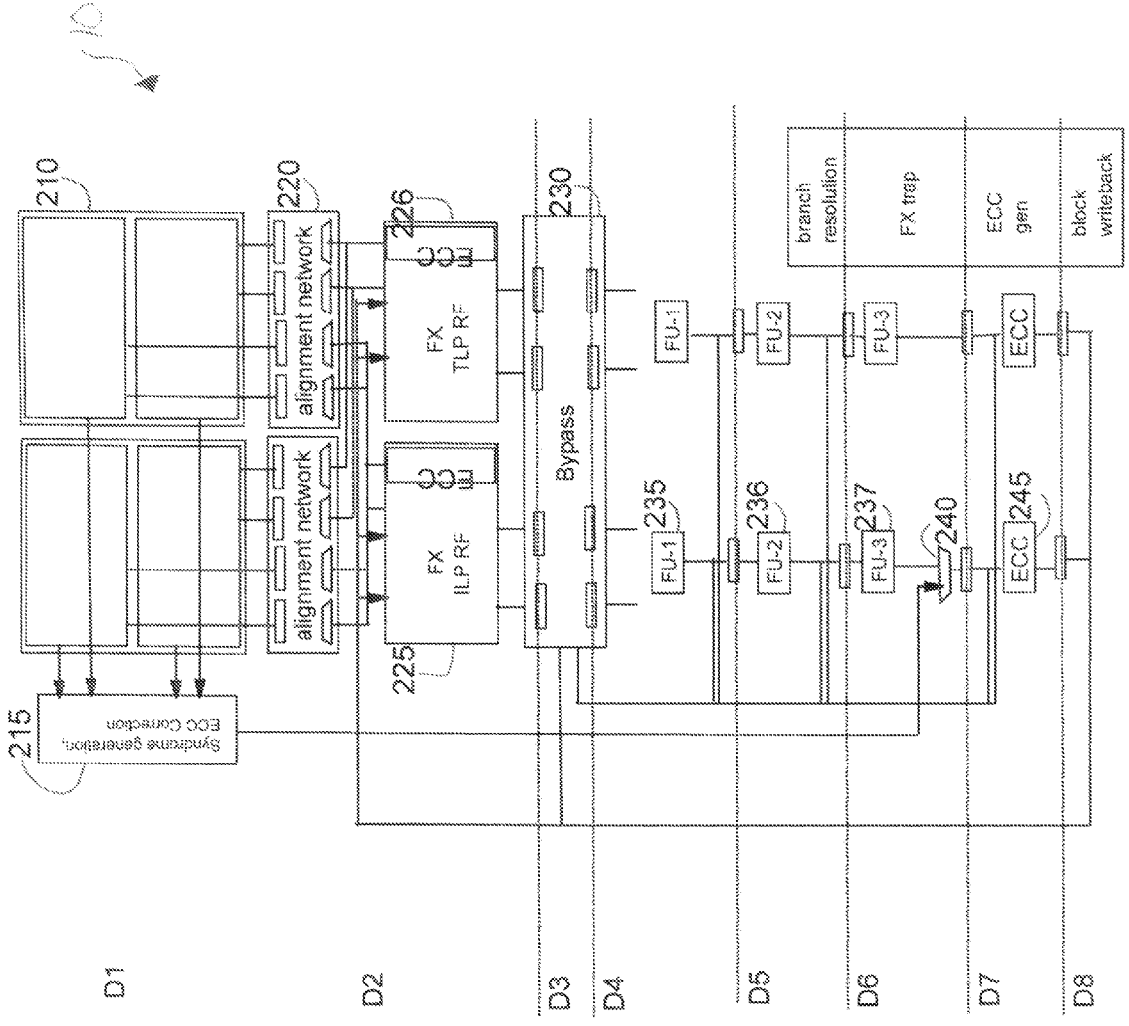
FIG. 3 is a schematic block diagram of a microprocessor pipeline illustrating and incorporating the invention of FIG. 2.

Referring initially to FIGS. 1-3, a system 10 for soft error recovery used during processor execution is initially described focusing on an in-order microprocessor core as an example. It should be understood by those skilled in the art that this description could very well have been on an out-of order microprocessor implementation, implying that similar advantages are achievable using the invention irrespective of whether one is dealing with an in-order or out-of-order microprocessor implementation.

As mentioned earlier, the main idea is to store the checkpointed state of the processor in the architectural register files rather than in a dedicated storage, as done in some prior art RAS implementations. This methodology allows a significant area reduction as compared to the prior art where the checkpointed state is stored in a dedicated storage. And this art of hardening the architectural register files to store the checkpointed state is especially important for microprocessor cores with larger number of multiple threads (e.g. four and beyond), since the overhead of the checkpoint and recovery mechanism may not scale with the increasing number of threads.

FIG. 1 shows a block diagram illustrating a typical prior art pipeline of a microprocessor where the IRR concept is implemented for system reliability. In contrast, FIG. 2 illustrates a pipeline of a microprocessor showing the IRR concept implementation in accordance with the invention.

The difference between the two schemes can be clearly seen in the nature of the pipeline structure. The prior art is a collection of two pipelines, a main pipe 110 and an auxiliary R-unit pipe 115, stitched together. The auxiliary R-unit pipe 115 is an additional piece of pipeline where the hardened storage structures for checkpointing are kept. In other words, the error-correcting code stage represented as ECC generate 111 resides on the auxiliary R-unit pipeline 115 after the write-back stage $D_n$.

The auxiliary R-unit pipeline 115 can clearly lead to further area overhead and further latency issues, since it adds additional stages to the main microprocessor pipeline 110 for handling reliability. On the other hand, as seen in FIG. 2, one embodiment of the invention includes a pipeline 120, which gets rid of the auxiliary R-unit pipeline 115, and instead introduces a single pipeline error-correcting code stage 121 in the main processor pipeline 120 to generate ECC for the value to be written, just before the write-back stage $D_n$.

In another embodiment, checkpointing issues are handled in the register file and recovery buffers 130. The recovery buffers 130 are used to capture potential data overflow from the register file since instructions may take longer to commit and data values associated with uncommitted instructions should still be kept around.

FIG. 3 is a block diagram of an in-order microprocessor FXU pipeline illustrating and incorporating the invention. Grid areas D1, D2, . . . and D8 illustrate the different stages within this embodiment of a microprocessor pipeline.

Stage D1 in FIG. 3 is basically the instruction transfer or issue stage immediately preceding the register file access stage. Logically in this stage the invention locates three major structures, for example. In this embodiment, the first structure is an alignment network 220, which is four ported and can receive and align four values and send them on to recovery buffers 210. The second structure, in this embodiment, is the four recovery buffers 210. The recovery buffers 210 are ECC protected storage structures that hold overflowed data of uncommitted instructions from the register files. The recovery buffers 210 may be implemented as simple single read/write memory arrays. For each recovery buffer 210, the recovery management logic maintains the head and tail pointers, for example, as will be discussed with reference to FIG. 4.

The third structure is the ECC syndrome logic structure 215. In this embodiment, the ECC syndrome logic 215 is responsible for ECC checking and error correction of the values stored in the recovery buffers 210, whenever there is the need to recover them, e.g. such as following a detected microprocessor error that invokes a system checkpoint recovery.

Stage D2 in FIG. 3 is the register file access stage of the microprocessor pipeline 120, for example. In here, this embodiment of the invention adds ECC storage 226 to the register file 225, to harden the data values stored in the register files for reliability. Stage D3 is a bypass stage 230, for bypassing operations from outputs of functional units to new instructions without having to go through the register file. Stages D4, D5 and D6 are pipelined execution stages for FU-1 235, FU-2 236 and FU-3 237, for instance.

D7 is a new stage introduced into the pipeline for ECC generation 245 of a value before it is written back into the register file. Finally, stage D8 is the write-back stage of the pipeline.

In order to permit the checkpointed state to be saved in the architectural register files, the checkpointing mechanism should allow the recovery of any value overwritten from the register file by an instruction that has not yet committed to the state. In particular this feature should be supported in the FXU pipeline for a design where the FXU pipe is shorter than the FPU pipeline. This is one of the reasons for providing the recovery buffers as described above, for example.

As shown in FIG. 3, the ECC for values 245 is generated in stage D7 and the newly computed value is written into the register file, along with the corresponding ECC. At the same time or a few cycles earlier before the write into the register file 225, the index of the register target is used to read out the register value to be overwritten along with its corresponding ECC. For a 4-way integer pipeline, in one cycle the recovery logic is such that it can read out up to four values which are to be overwritten by instructions in the FXU pipeline.

Figure 4:
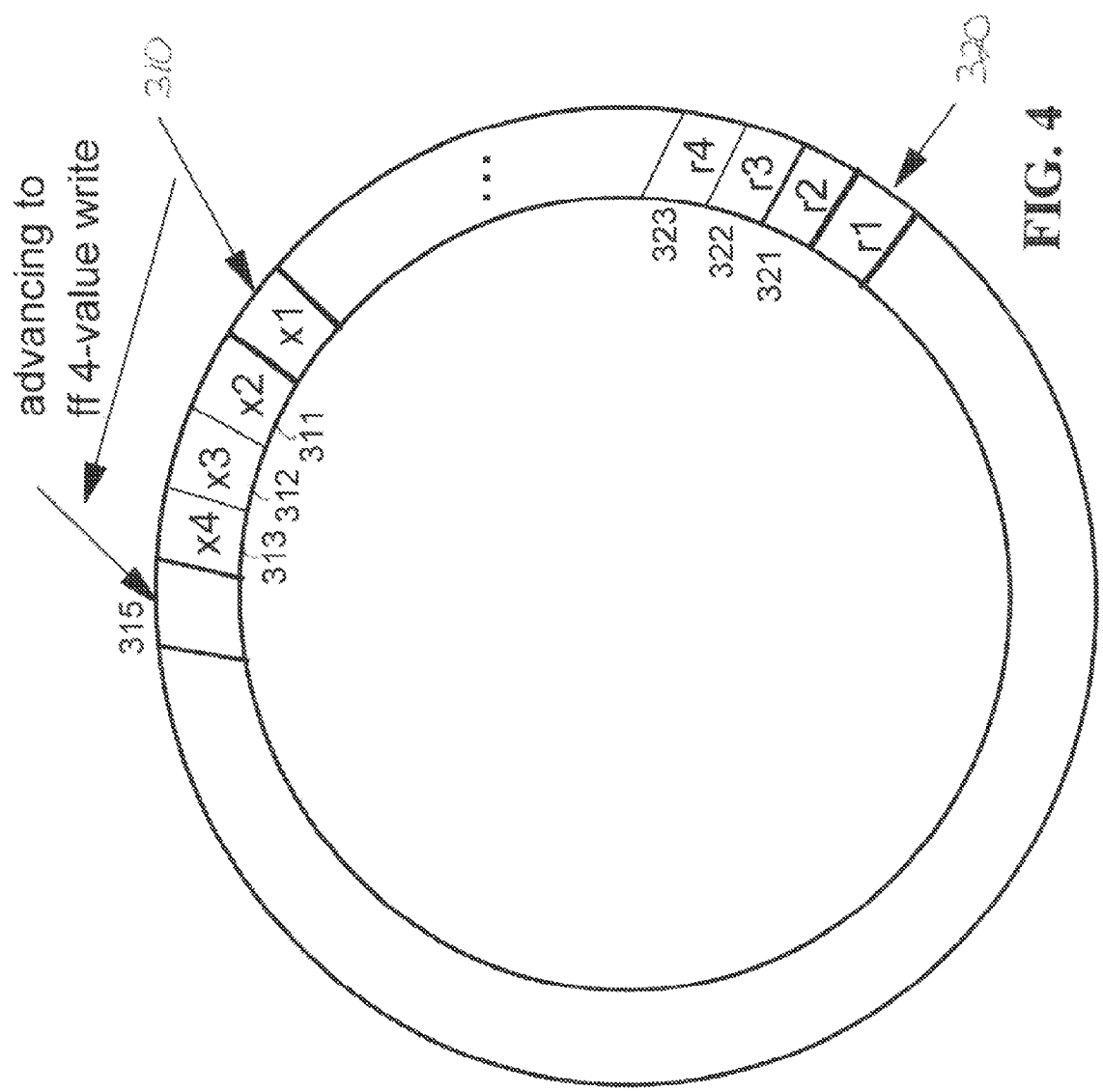
FIG. 4 is a block diagram illustrating how entries in the recovery buffers are organized in accordance with the invention of FIG. 2.

After being read out of the register file, the values which are to be overwritten go through an alignment network 220 which aligns them with respect to which of the four recovery buffers 210 it is to go into. The index of each of the values to be overwritten (that is the name of the architectural register) is attached to the corresponding value, along with the ECC. The recovery buffer 210 entries are managed in a circular fashion (as illustrated in FIG. 4) with head pointers 310 and tail pointers 320.

The values, indexes, and corresponding ECCs are written to the location pointed to by the head pointers 310, after which the head pointers are advanced accordingly 315, for example. The tail pointer 320 is advanced whenever an instruction which caused the creation of the corresponding entry is committed, that is when the value overwritten by that instruction is no longer needed, because there is a more recent checkpointed value either in the architectural register file 225, or in an older location in one of the recovery buffers 210.

The pointer maintenance logic checks for an overlap between the head pointer 310 and tail pointer 320. If saving the new value into the recovery buffers 210 would cause an overlap between the head pointer 310 and tail pointer 320, the issue of new instructions is stalled until the processor commits a sufficient number of instructions to clear extra space in the recovery buffers 210.

As alluded to earlier, an embodiment of the present invention assumes that there is some form of error checking hardware in place throughout the processor pipeline constantly checking for errors. Again this may take the form of parity checking or ECC checking on various storage structures, or residual checking on combinational logic structures. It could also be a form of thread comparison, where a thread is run multiple times and when both versions of the thread reach a specified point in the execution, their states are compared for errors.

Whatever form of error checking is adopted in the processor pipeline 120, the recovery approach here kicks in when an error is detected. When an error is detected in the processor pipeline 120, it will often result in the need for recovering the values in the recovery buffers 210 to back up into the previous checkpoint to re-execute from the last known correct processor state.

Figure 5:
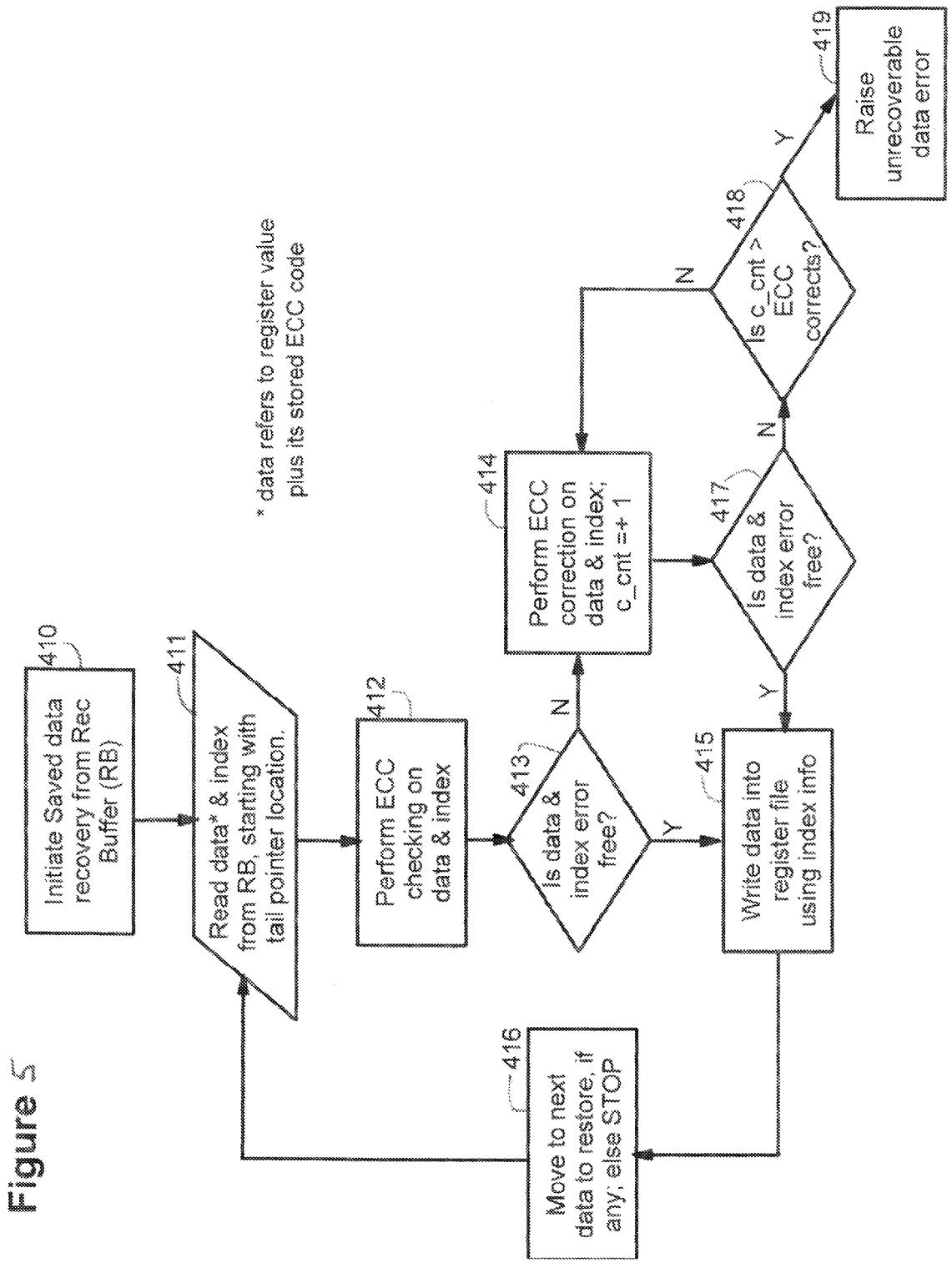
FIG. 5 is a flowchart illustrating the process of recovering values stored in the recovery buffers following error detection in the microprocessor for system recovery in accordance with the invention of FIG. 2.

FIG. 5 gives a clear step by step approach to recovering values in the recovery buffers 210 into the register files at Block 410. The values are read out of the recovery buffers 210 in such an order where the value pointed to by the tail pointer 320 is read out first at Block 411. The values include the stored data, its ECC code, and its corresponding architected register file index. Both the values and indexes undergo an ECC checking and recovery at Blocks 412 and 413, and written back to the architected register file if there are no errors at Block 415. If there are errors, the ECC recovery at Block 414 attempts to correct the data and write into the architected register file at Block 415 when successful.

If ECC correction fails at Block 419, an unrecoverable data error flag is raised and the system error is escalated to a checkstop for handling, as stated earlier. Note that the index read out of the recovery buffer 210 is used as the address to the architectural register file to restore the corresponding value. This is a sequential process, where only one value is recovered per cycle, for example. Thus, in this particular embodiment, the maximum number of the recovery cycles equals the number of entries in all four recovery buffers 210.

We next describe the implementation details that would allow the described mechanism to be implemented without the overhead of adding extra read ports needed for reading out the architected register files values that need to be saved in the recovery buffer 210. Our mechanism implementation is described in the context of a microprocessor implementation that supports a dual morph of both Instruction Level Parallelism (ILP) and Thread Level Parallelism (TLP).

In the integer FX unit we describe, the ILP register file is a 4 read, 4 write 64×78 (64 b+14 b ECCs) custom array. In the ILP morph, it holds architected registers of both ILP threads t0 and t1. It writes four results per cycle (results of fx0, fx1, ls0 and ls1) through the four write ports. It supplies read operands only for FX0. Read ports a0 and b0 are used for this purpose. The remaining read ports a1 and b1 (implemented as upper pins) are used to read out two values to be overwritten in the next cycle by results from fx0 and ls0.

In the TLP morph, the ILP register file holds architected registers of t0 and t0a, and only writes results from ls0 and fx0 through the corresponding write ports (ls0 and fx0 are the only units that can be used by thread t0 and t0a in the TLP morph). The write ports ls1 and fx1 are not used in the ILP morph. Like in the ILP morph, the read ports a0 and b0 are used to read out source operands for FX0, and read ports a1 and b1 are used to read out the two values to be overwritten in the next cycle by results from fx0 and ls0.

The TLP register file is a 4r/4w 64×78 (64 b+14 b ECCs) custom array. In the ILP morph it holds GPRs of both ILP threads t0 and t1. Like in the FX ILP GPR, it writes four results per cycle (fx0, fx1, ls0 and ls1) through the four write ports, however, unlike the FX ILP register file it supplies read operands only for FX1. Read ports a1 and b1 are used for this purpose. The remaining read ports a0 and b0 (upper pins) are used to read out two values to be overwritten in the next cycle by results from fx1 and ls1.

In the TLP morph, the TLP register file hold GPRs of t1 and t1a, and only writes results from ls1 and fx1 through the corresponding write ports (ls1 and fx1 are the only units that can be used by thread t1 and t1a in the TLP morph). The write ports ls0 and fx0 are not used in the ILP morph. Like in the ILP morph, the read ports a1 and b1 are used to read out source operands for FX0, and read ports a0 and b0 are used to read out the two values to be overwritten in the next cycle by results from fx1 and ls1.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that other modifications and embodiments are intended to be included within the scope of the appended claims.

That which is claimed is:

1. A system for soft error recovery during processor execution, the system comprising:
    a processor;
    register files to store checkpoint data of the processor;
    recovery buffers to store register values of the register files and error-correcting codes for the register values;
    at least one first port to transfer the register values to the recovery buffers during an overflow condition at the register files;
    at least one second port to transfer the register values from the recovery buffers to the register files; and
    an error-correcting code stage to check the register values to be written by the recovery buffers to the register files for soft errors.

2. The system of claim 1 wherein the error-correcting code stage can correct any error in the register values.

3. The system of claim 1 wherein the register files provide checkpointing storage for the processor.

4. The system of claim 3 further comprising a bypass stage which provides bypassing operations around the register files.

5. The system of claim 1 wherein the recovery buffers provide checkpointing storage for the processor.

6. The system of claim 5 wherein the recovery buffers are error-correcting code protected.

7. The system of claim 5 further comprising an alignment network to provide the register values to the recovery buffers.

8. The system of claim 5 further comprising an error-correcting code syndrome logic to check and, if necessary, correct the register values stored in the recovery buffers.

9. The system of claim 1 wherein the processor lacks a recovery unit pipeline.

10. A method for soft error recovery during processor execution, the method comprising:
    reducing cycle time of a processor with a pipeline; and
    checking a value to be written by the processor for any soft errors in an error-correcting code stage within the pipeline before a write-back stage of the pipeline
    providing register files to store checkpoint data of the processor;
    providing recovery buffers to store register values of the register files and error-correcting codes for the register values;
    providing at least one first port to transfer register values to the recovery buffers during an overflow condition at the register files;
    providing at least one second port to transfer the register values from the recovery buffers to the register files; and
    checking the register values to be written by the recovery buffers to the register files for the soft errors.

11. The method of claim 10 further comprising correcting any error in the register values.

12. The method of claim 10 further comprising providing the register files to provide checkpointing storage for the pipeline.

13. The method of claim 12 further comprising providing a bypass stage which provides bypassing operations around the register files.

14. The method of claim 10 further comprising providing the recovery buffers to provide checkpointing storage for the processor.

15. The method of claim 14 further comprising protecting the recovery buffers with error-correcting code.

16. A computer program product embodied in a non-transitory tangible media comprising:
    computer readable program codes coupled to the non-transitory tangible media for soft error recovery during processor execution, the computer readable program codes configured to cause the program to:
    reduce cycle time of a processor through use of a pipeline; and
    check a value to be written by the processor for any soft errors in an error-correcting code stage within the pipeline before a write-back stage of the pipeline;
    store checkpoint data of the processor in register files;
    store register values of the register files and error-correcting codes for the register values in recovery buffers;
    transfer the register values to the recovery buffers during an overflow condition at the register files; and
    transfer the register values from the recovery buffers to the register files;
    check the register values to be written by the recovery buffers to the register files for the soft errors.

17. The computer program product of claim 16 further comprising program code configured to: correct any error in the register values.

18. The computer program product of claim 16 further comprising program code configured to: provide the register files to perform checkpointing storage for the pipeline.

19. The computer program product of claim 18 further comprising program code configured to: provide a bypass stage which provides bypassing operations around the register files.

20. The computer program product of claim 17 further comprising program code configured to: provide the recovery buffers to perform checkpointing storage for the processor.

* * * * *